Oct. 10, 1967   D. L. WATSON ET AL   3,346,399
EXPANDABLE FROZEN DOUGH PACKAGE
Filed June 2, 1964   2 Sheets-Sheet 1

INVENTOR
DIGHTON L. WATSON
FOREST K. MICHAELSON
BY Robertson Dunning
ATTORNEY

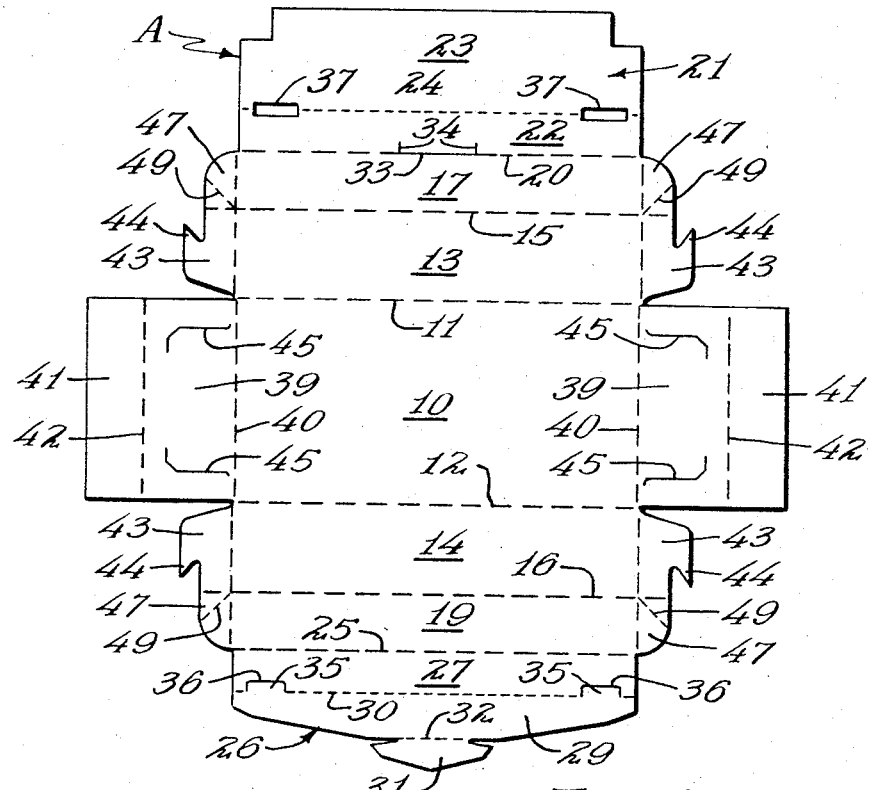
FIG. 5
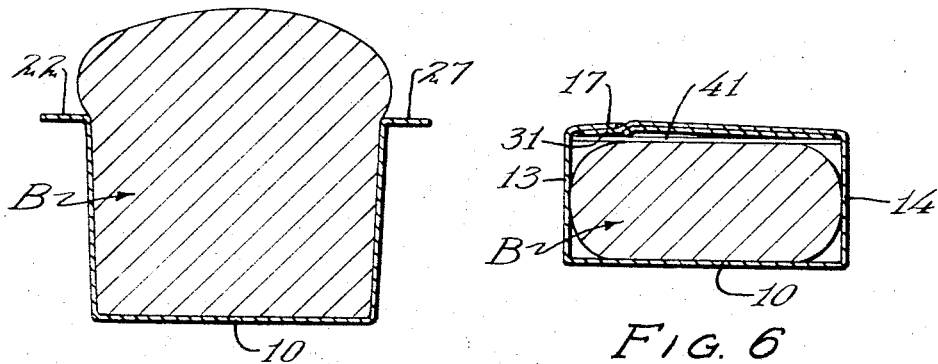
FIG. 7
FIG. 6
INVENTOR
DIGHTON L. WATSON
FOREST K. MICHAELSON United States Patent Office 3,346,399
Patented Oct. 10, 1967

3,346,399
EXPANDABLE FROZEN DOUGH PACKAGE
Dighton L. Watson, 4033 13th Ave. S. 55407, and
Forest K. Michaelson, 4008 46th Ave. S. 55406,
both of Minneapolis, Minn.
Filed June 2, 1964, Ser. No. 371,920
8 Claims. (Cl. 99—172)

ABSTRACT OF THE DISCLOSURE

A vertically expandable package of heat resistant material in combination with frozen expandable dough, the package side and end walls having extensions which serve as a cover for the package when stored, and as substantially coplanar extensions of the side and end walls during baking. Flanges extend along the side wall extensions to prevent bowing of the side walls when the dough is rising and during baking. Gusset folds connect the extensions to the side walls enabling the side wall extensions to overlie the package contents in one position, and when the extensions are erected to support the raised dough during baking.

---

This invention relates to an improvement in an expandable package for the packing of, and use in conjunction with, frozen dough and other materials and deals particularly with a carton capable of holding a quantity of expandable material such as bread dough, which when opened, may provide proper space to permit the dough to raise vertically, and which may be used as a disposable cooking receptacle.

During recent months, the production of frozen bread dough for sale in retail stores has become extremely popular. This dough is packaged and sold in various types of packages. For example, a series of loaves of bread are placed in inexpensive plastic trays, enclosed in a flexible plastic bag, and placed in a paperboard carton. In other instances, a series of loaves similarly formed and placed in a printed flexible plastic bag. As the loaves of dough are sold for a relatively low price, it is important to keep the price of packaging as low as possible. According to instructions, when the dough is to be used, it is removed from its package, coated with shortening on its outer surface, and placed in a bread pan which is also coated with shortening. The bread is allowed to thaw, whereupon the yeast in the dough causes the dough to expand. After the bread has risen to the desired extent, the pans containing the bread are placed in a preheated oven for a suitable time period to produce the baked loaves. The product has proven very popular, as the bread has the flavor of home baked bread which has become rather rare due to the ready availability of bakery bread.

One of the difficulties often experienced with this product lies in the fact that it should be baked in a pan of a predetermined size. As the loaves which are produced are of uniform size, a properly sized loaf will not result if the pan is too large or too small. A relatively small proportion of homes have bread pans, and some difficulty is experienced finding a pan which is of just the proper size for the loaves produced. Thus there is a tendency to bake the bread in whatever type of pan is readily available rather than to try to get one of the proper size. This often leads to discouraging results.

Attempts have been made to package the dough in a disposable pan which is of the proper size to produce a well-shaped loaf of bread. However, when this is done, the product fills less than one-half of the package. Accordingly, in the absence of some means for holding the frozen dough in place in the package, it will move about during transportation and handling. Furthermore such packages waste half the space in a refrigerator cabinet.

It is an object of the present invention to produce a carton made of material capable of withstanding the temperatures at which the bread is baked and which may be used for the packaging of the frozen dough. This package is made in such a manner that upon opening, the material can be folded to increase the height of the side and end walls, thus forming a tray which is perhaps twice the depth of the original package. Thus while being stored, the package is only of approximately the proper size to accommodate the frozen dough. At the same time, when the package is opened, a tray of sufficient depth is provided so that the bread dough may expand into a loaf of proper dimensions.

A feature of the present invention resides in the fact that the carton is so constructed that the outward folding of the upper portions of the side and end walls is limited. Before the cartons are opened, the side and end walls are folded inwardly to overlie the expandable material. When the carton is opened, there may be some tendency for the side and end wall portions which were previously folded inwardly to return to their former position. The arrangement is such that the upper portions of these walls will be forced into vertical position by the raising of the dough, thus insuring a properly shaped loaf.

A further feature of the present invention resides in the provision of flanges hingedly connected to the upper edges of the side walls, and which are folded outwardly into a substantially common plane when the carton is erected. As a result, the relatively long side walls are held from outward bulging during the expansion of the expandable material and during the cooking process.

These and other objects and novel features of the present invention will be more clearly and fully set forth in the following specification and claims.

In the drawings forming a part of the specification:

FIGURE 5 is a diagrammatic view of the blank from which the carton is formed.

FIGURE 6 is a sectional view of the carton in closed position showing the expandable material enclosed therein.

FIGURE 7 is a diagrammatic section through the carton after the contents have been expanded.

Figure 1:
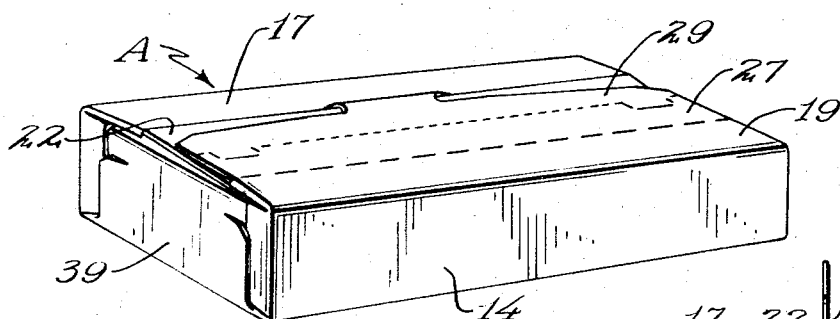
FIGURE 1 is a perspective view of the carton in closed position.

With reference to FIGURE 5 of the drawings, it will be noted that the blank illustrated therein includes a bottom panel 10 which is foldably connected along a pair of parallel fold lines 11 and 12 to lower side wall portions 13 and 14, respectively. The lower side walls 13 and 14 are connected along parallel fold lines 15 and 16 to upper side wall portions 17 and 19, respectively. The first side wall 17 is connected along a fold line 20 to a top panel which is indicated in general by the numeral 21. The top panel 21 includes a flange 22 and an extension portion 23 which are connected along a perforated line 24.

The upper side wall 19 is connected along a fold line 25 to a second top panel portion 15 which includes a flange 27 which is connected by the fold line 25 to the upper side wall 19 and a locking extension 29 which is connected to the flange 27 along a perforated line 30. A locking tongue 31 is hingedly connected to the locking portion 29 along a fold line 32.

In actual practice, when the carton is closed, the upper side wall 17, the flange 22, and the extension 23 are in a common plane to close the top of the carton. The upper side wall 19 and flange 27 are designed to overlie the top structure at the opposite side of the carton. A slot 33 extends along the fold line 20 in line with the locking tongue 31 and is designed to accommodate the same. Parallel right angular cut lines 34 communicate with the slot 33 to simplify the deflection of a portion of the flange 22 to admit the locking tongue 31.

A pair of substantially rectangular locking tongues 35 are connected to the locking extension 29 and are formed by U-shaped cut lines 36 which terminate at the fold line 30. Apertures 37 are provided near opposite ends of the perforated line 24 in alignment with the locking tongues 35 and are adapted to accommodate the locking tongues.

End walls 39 are hingedly connected to opposite ends of the bottom panel 10 along parallel fold lines 40 which are in substantially right angular relation to the previously described fold lines. End flap extensions 41 are hingedly connected to the end walls 39 along fold lines 42 which are parallel to the fold lines 40. The end walls 39 are of substantially the same width as the side walls 13 and 14, and the end wall extensions 41 are of substantially the same width as the upper side wall portions 17 and 19.

Corner flaps 43 are hingedly connected to opposite ends of the side wall panels 13 and 14 along extensions of the fold lines 40. The corner flaps 43 are provided with hook-like extensions 44 which are designed to extend through locking slots 45 in the end walls 39. In forming the carton, the corner flaps 43 are folded to lie outwardly of the end wall panel 39 and the hooklike extensions 44 are inserted through the locking slots 45 to engage inwardly of the end walls and to lock the side and end walls in right angular relation. Corner flaps 47 are also connected to the ends of the side wall extensions 17 and 19 along extensions of the fold lines 40. The corner flaps 47 are also connected to the corner flaps 43 along fold lines which are extensions of the fold lines 15 and 16. Diagonally extending fold lines 49 extend across the corner flaps 47 from the juncture between the fold line 15 and the fold lines 40, and the fold line 16 and the fold lines 40, respectively. These diagonal fold lines 49 divide the corner flaps 47 into two foldably connected parts which may be folded along the diagonal fold lines in substantially face contact.

In the formation of the carton, which may be indicated in general by the letter A, the side and end walls are folded up into substantially right angular relation to the bottom panel 10, and the corner flaps 43 are folded outwardly of the end walls 39 with the locking tongues 44 extending through the cooperable slots 45. This holds the side and end walls into tray-shaped form. When in this position, the expandable material such as bread dough B may be placed into the carton to lie upon the bottom panel 10. In closing the carton, the end wall extensions 41 are then folded down into substantially coplanar relation and at the same time, the corner flaps 47 are folded inwardly, at the same time the side wall extensions 17 and 19 are folded downwardly. This provides a gusset fold at each corner of the carton and permits the top portion 21 as well as the side wall extension 17 to which it is attached to overlie the carton contents. The side wall extension 19 and the flange 27 are also folded downwardly to overlie the opposite top panel construction, but the locking extension 29 is restrained during this downward folding operation so that the locking tongues 35 extend through the apertures 37. When this is accomplished, the locking extension 29 is folded downwardly and the locking tongue 31 inserted through the slot 33 to lock the cover closed in the position shown in FIGURE 1 of the drawings.

Figure 3:
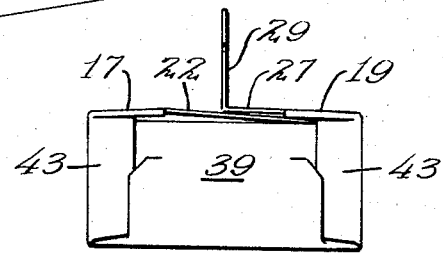
FIGURE 3 is an end elevational view of the package when in the position shown in FIGURE 2.
Figure 2:
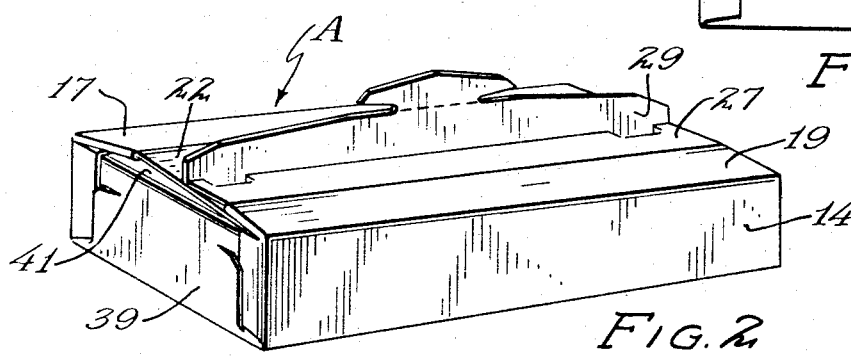
FIGURE 2 is a view similar to FIGURE 1 showing the carton in partially closed position.
Figure 4:
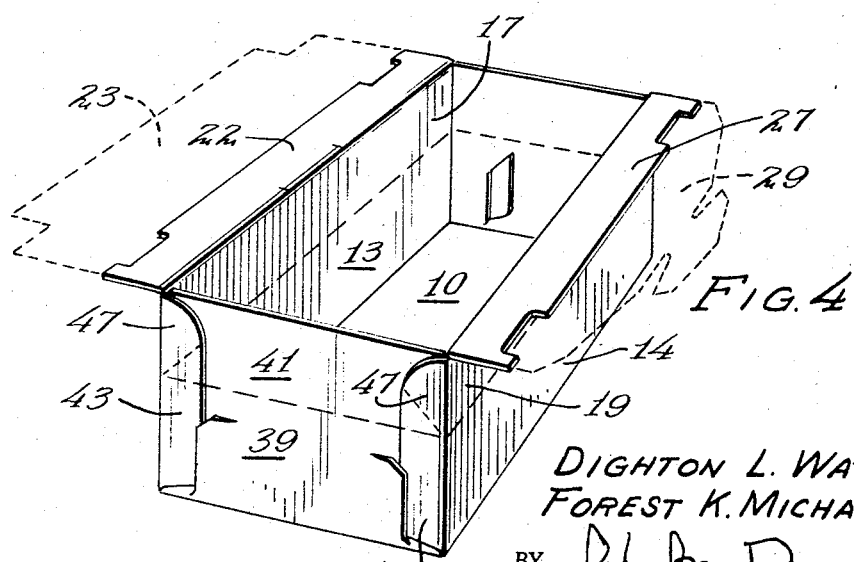
FIGURE 4 is a perspective view of the carton in open position.

When in closed position, the bread dough B substantially fills the package as indicated in FIGURE 6 of the drawings. The dough remains in this size and shape during the time that it remains in a frozen state. However, when it is desired to use the bread, the locking tongue 31 is disengaged from the slot 33 and a locking extension 29 folded upwardly toward the position shown in FIGURES 2 and 3 so that the side wall extensions 17 and 19 may be folded into coplanar relation to the side walls 13 and 14 to which they are secured. This action also causes the corner flaps 47 to fold into the plane of the corner flaps 43. The end wall extensions 41 may then be folded upwardly against the corner flaps 47 as shown in FIGURE 4.

Once the package is opened, the dough is permitted to raise, which it does automatically after thawing. The cover panels 23 and the locking extension 29 are preferably torn off along the perforated lines 24 and 30 and the flanges 22 and 27 are turned outwardly into the position illustrated in FIGURE 7 of the drawings. When in this position, they restrain the side walls and their extensions from bowing outwardly to any great extent.

The tray is preferably made of paperboard laminated to metal foil, and the metal foil is preferably coated with a silicone material which acts as a release agent, and prevents the dough from adhering to the foil. The board of this type is capable of withstanding the temperatures at which the bread is baked without deterioration. After the dough B has risen, it extends well above the side walls of the carton as indicated in FIGURE 7 of the drawings and assumes the regular shape of a loaf of bread.

In accordance with the patent statutes, the principles of construction and operation of this improvement in "Expandable Package" have been described, and while an endeavor has been made to set forth the best embodiment thereof, it should be understood that changes may be made within the scope of the following claims without departing from the spirit of the invention.

We claim:
1. A vertically expandable package for use as a disposable baking receptacle in a combination with frozen expandable dough which expands to a volume greater than that of the frozen dough, the packaging including a sheet of heat resistant flexible material cut and creased to provide:
   a rectangular bottom panel,
   a pair of upstanding side walls hingedly connected to two opposed edges of said bottom panel,
   a pair of upstanding end walls hingedly connected to the remaining opposed walls of said bottom panel,
   side and end wall extensions hingedly connected to the side and end walls respectively along lines of fold parallel to those connecting the side and end walls to said bottom panel,
   corner flaps hinged to the edges of the walls of one pair and secured in surface contact with the outer surfaces of the walls of the other pair,
   extension corner flaps hingedly connected to the wall extensions of said one pair of side walls and hingedly connected to said first named corner flaps,
   said extension corner flaps lying outwardly of the side walls of said other pair in erected position of said side wall extensions,
   said wall extensions being folded into position parallel to said bottom panel and said extension corner flaps being diagonally creased and folded beneath the wall extensions of said one pair of walls to provide a cover for said package,
   whereby, when the dough rises the expansion of said dough urges the side and end wall extensions into substantially coplanar relation to the walls to which they are hinged thus providing a receptacle of sufficient depth which enables the dough to expand into proper dimensions prior to baking in said receptacle.

2. The structure of claim 1 and in which the one pair of walls comprises the side walls.

3. The structure of claim 1 and in which portions of the extension corner flaps are secured to the said other wall extensions to remain in face contact therewith.

4. The structure of claim 1 and including flanges hingedly connected to said side wall extensions along lines of fold parallel to those connecting said extensions to said side walls.

5. A vertically expandable package for use as a disposable baking receptacle in combination with frozen expandable dough which expands to a volume greater than that of the frozen dough, the package including a sheet of heat resistant flexible material cut and creased to provide:

a rectangular bottom panel,
a pair of upstanding side walls hingedly connected to two opposed edges of said bottom panel,
a pair of upstanding end walls hingedly connected to the remaining opposed walls of said bottom panel,
side and end wall extensions hingedly connected to the side and end walls respectively along lines of fold parallel to those connecting the side and end walls to said bottom panel,
corner flaps hinged to the end edges of the side walls,
extension corner flaps hinged to the end edges of the wall extensions hinged to said end walls and foldably connected to the upper edges of said first named corner flaps,
said extension corner flaps being diagonally creased along a line of fold emanating from the junctures between the fold lines connecting said extension flaps and said side wall extensions and the fold lines connecting said extension corner flaps and said first named corner flaps,
flanges hingedly connected to said side wall extensions along lines parallel to the fold lines connecting said side wall extensions and said side walls, and
a cover panel hinged to at least one of said flanges and overlying the other of said flanges when said wall extensions are folded parallel to said bottom panel,
said diagonal lines of fold in said extension flaps permitting the portions of said extension corner flaps on opposite sides of said diagonal fold lines to fold into face contact beneath said side wall extensions when said extensions are folded downwardly,
whereby, when said dough rises, the expansion of said dough urges the side and end wall extensions into substantially coplanar relation to the walls to which they are hinged thus providing a receptacle of sufficient depth which enables the dough to expand into proper dimensions prior to baking in said receptacle.

6. The structure of claim 5 and in which the portion of said extension corner flaps beneath said diagonal score lines are secured to said end closure flaps.

7. The structure of claim 5 and in which both of said flanges have cover panels secured thereto.

8. The structure of claim 5 and including interlocking means on said cover panels.

References Cited

UNITED STATES PATENTS

| | | | |
|---|---|---|---|
| 1,475,708 | 11/1923 | Levine | 229—36 |
| 2,323,782 | 7/1943 | Kretchmer | 229—36 |
| 2,568,170 | 9/1951 | Ringler | 229—44 X |
| 2,649,379 | 8/1953 | Woods | 99—172 X |
| 2,948,624 | 8/1960 | Watson et al. | 99—172 X |
| 3,176,904 | 4/1965 | Collura | 229—38 X |

RAYMOND N. JONES, *Primary Examiner.*